United States Patent
Schuchardt

(10) Patent No.: US 6,637,928 B2
(45) Date of Patent: Oct. 28, 2003

(54) STATIC MIXER

(75) Inventor: Heinrich Schuchardt, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 110 days.

(21) Appl. No.: 10/021,713

(22) Filed: Dec. 12, 2001

(65) Prior Publication Data
US 2002/0118598 A1 Aug. 29, 2002

(30) Foreign Application Priority Data
Dec. 20, 2000 (DE) .......................... 100 63 485

(51) Int. Cl.[7] ................................. B01F 5/06
(52) U.S. Cl. ...................................... 366/337
(58) Field of Search ................. 366/336, 337, 366/338, 339

(56) References Cited

U.S. PATENT DOCUMENTS

| 4,062,524 A | | 12/1977 | Brauner et al. ............. 366/340 |
| 4,352,378 A | * | 10/1982 | Bergmann et al. ........... 366/337 |
| 4,744,928 A | * | 5/1988 | Meier ......................... 366/337 |
| 4,758,098 A | * | 7/1988 | Meyer ........................ 366/337 |
| 5,378,063 A | | 1/1995 | Tsukada ..................... 366/337 |
| 5,484,203 A | | 1/1996 | King et al. ................. 366/337 |
| 5,620,252 A | | 4/1997 | Maurer ....................... 366/337 |
| 5,688,047 A | * | 11/1997 | Signer ........................ 366/337 |

* cited by examiner

Primary Examiner—Tony G. Soohoo
(74) Attorney, Agent, or Firm—Norris McLaughlin & Marcus

(57) ABSTRACT

A static mixer comprising a hollow housing defining an internal longitudinal passageway within which there is arranged an assembly of planer mixer elements having projecting longitudinal components.

23 Claims, 8 Drawing Sheets

STATIC MIXER

This invention relates to a static mixer, comprising at least a hollow housing with a multiplicity of mixer elements, which are arranged such that they are stacked in the housing. The hollow housing is defining an internal longitudinal passageway within which mixer elements are arranged. The mixer elements are planar elements having projecting longitudinal components.

For the mixing of liquids, static mixers are often used, whereby a pump forces the liquids through a tube provided with static mixer internals.

The following two devices are mentioned as examples of known static mixers:

In the case of the so-called Kenics mixers (see "Mischen beim Herstellen und Verarbeiten von Kunststoffen" [mixing in the preparation and processing of plastics], published by VDI Ges. Kunststofftechnik, VDI-Verlag 1986, pages 238–241), the liquid flow of the product to be mixed is divided into several individual streams by a separating plate fitted into the tube. This separating plate is twisted about the tube axis. In each of the individual streams, an eddy flow is produced, which leads to the liquid being redistributed in the cross section of the tube. In practice, a plurality of such mixing elements are arranged one behind the other in order to keep re-dividing the liquid and to achieve an adequate mixing result. Satisfactory mixing is typically achieved only after passing the liquids through 10 to 12 of such mixing elements.

The so-called SMX mixers (cf. U.S. Pat. No. 4,062,524) comprise two or more mutually perpendicular grids of parallel sheet-metal strips, which are welded to one another at their crossing points and are set at an angle with respect to the main direction of flow of the product to be mixed, in order to divide the liquid into several individual streams and mix it. The manufacturing effort for these mixers is very high because of the many weld connections required. A single mixing element alone is unsuitable as a mixer, since thorough mixing only takes place along a preferential direction transverse to the main direction of flow. Therefore, a plurality of mixing elements which are turned through 90° with respect to one another must be arranged one behind the other. Thorough mixing typically requires at least 5 or 6 elements.

This can be explained as follows: an SMX mixer has only two grids of parallel bars turned through 180° with respect to each other. These grids comprise layers of equi-distant bars. Neighboring layers are arranged in line with one another. Each layer represents a plane of symmetry which is not crossed during mixing.

The object of the present invention is to provide a static mixer which achieves the good mixing effect of the SMX mixer and combines this with minimal production requirements.

The object is achieved according to the present invention by a static mixer comprising a hollow housing defining an internal longitudinal passageway, having a longitudinal axis, within which a plurality of planar mixer elements are arranged, one after the other such that they are stacked in the housing to form an assembly of mixer elements, said planar mixer elements are comb- or star shaped planar elements with a central bar on which at least two teeth are provided on each of both sides of the bar and wherein adjacent mixer elements within the static mixer are rotated about the longitudinal axis of the longitudinal passageway of the housing by an angle α with respect to each other so that one tooth of a mixer element in each case reaches into the intermediate space between two teeth of a respectively adjacent mixer elements.

Preferably, the turning angle α is from 35° to 160° with particular preference for a turning angle of from 45° to 135°.

When so turned with respect to each other, one of the longitudinal components of a mixer element may project into the space between the longitudinal components of a neighboring mixer element.

The comb shaped elements preferably can be described as having a) first and second longitudinal components, each having two transverse edges and two longitudinal edges; said two longitudinal components being spaced apart from each other and connected to each other by a third longitudinal component having two transverse edges and two longitudinal edges, one transverse edge of said third longitudinal component being connected to one longitudinal edge of one of said first and second longitudinal components, and the other transverse edge of said third longitudinal component being connected to one longitudinal edge of the other of said first and second longitudinal components, and optionally having one or more further longitudinal components between and spaced apart from said first and second longitudinal components and from each other, and joined to each other and to said first and second longitudinal components by said third longitudinal component, or The star shaped elements preferably can be described as having b) first and second longitudinal components which intersect each other to form a figure

wherein γ represents an angle α of from 10° to 170°, preferably 45° or 90°.

Preferably, the shape of the planar mixer elements define an H, or X.

In further embodiments, the mixer elements which comprise two spaced apart longitudinal components which are connected by a third longitudinal component may further comprise at least one further longitudinal component between and spaced apart from the two spaced apart longitudinal components, and also connected to the two longitudinal components by the third longitudinal component.

The X-shaped mixer element may, of course, also comprise one or more further longitudinal components (teeth) which cross at least one of the two longitudinal components defining the X-shape.

Preferably, each mixer element contacts at least one adjacent mixer element.

In a particularly preferred embodiment, the longitudinal components (teeth) of the mixer elements have at least one end which is shaped to provide for line or surface contact with the internal surface of the hollow housing defining the internal passageway. This increases the stability of, for example, a loose stack of mixer elements in the housing. Preferably, said at least one end of the longitudinal components has a transverse edge which has a width and a length, and is rounded across the length of its transverse edge.

Particular stability of the assembly of mixer elements is achieved if, in a preferred design, two neighboring mixer elements contact one another at at least three different points. As a result, the mixer elements are stabilized against displacement in relation to one another.

The stability is further increased in an embodiment of the mixer in which mixer elements which are one removed from each other, i.e., having a third mixer element between them, contact each other, in addition to contacting a mixer element between them.

This produces a particularly high mechanical load-bearing capacity and stability. The mixer elements thereby hold one another in their respective positions.

A particularly preferred variant of the static mixer comprises H-shaped mixer elements, wherein the planes of neighboring H-shaped mixer elements are turned with respect to one another by an angle α of 100°–110°.

This is because, although an angle close to 90° would lead to a good mixing effect, the stated angular range of 100°–110° enables the ends of the longitudinal components mixing elements that are one-removed from each other to extend past one another without colliding. To clarify the meaning of the expression "the ends of the longitudinal components", such "ends" of H, X shaped mixer elements are shown as a, b, c and d in the following representations of such mixer elements:

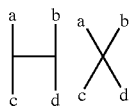

Likewise preferred is a static mixer wherein the mixer has H-shaped mixer elements, and the diameter of the housing is 3.5 to 5 times the (teeth) width of the space between adjacent ends of the longitudinal components. Examples of this distance, referring to the H configuration shown above, are the distance from a to b and c to d.

In this embodiment, the mixing effect is particularly good, since the liquid stream is divided into streams of similar sizes in the spaces between the spaced apart longitudinal components, sometimes referred to as "the legs" of the H, and spaces between individual mixer elements themselves as well as between individual mixer elements and the walls of the housing.

The static mixer is particularly suitable for the mixing of medium- and high-viscosity media, for example, for polymer melts and solutions with other substances, such as, for example additives and dyes.

The holding-together of the mixer elements is further improved if, in a further preferred embodiment, the neighboring mixer elements have interengaging notches at their points of contact with each other.

Although it is preferred for many purposes that the longitudinal components of the mixer elements have a uniform width, that is to say, uniform distance between their two longitudinal edges, a further embodiment of the present invention is one wherein at least a portion of at least one longitudinal component of the mixer elements has a greater or lesser width than the remainder of such longitudinal component. Alternatively or additionally, at least one edge of at least one longitudinal component of a mixer element may be provided with one or more projections on at least one longitudinal or transverse edge, which one or more projections extends towards or away from the other longitudinal components of the mixer element.

For example the central bar of the mixer element can have a widened portion. In another preferred embodiment the mixer elements have a central bar or point of intersection, which is offset from the central position, the teeth being longer on one side of the bar or point of intersection:

Also particularly preferred is a variant of the static mixer wherein the mixer elements have at their points of contact with each other supporting surfaces by which neighboring mixer elements touch one another with surface-area contact. This is of particular advantage, since the assembly of mixer elements becomes more stable with regard to the force transmission during the mixing of high-viscosity products. Plastic deformation of the mixer elements at their points of contact is consequently avoided.

An increase in the mechanical stability of the assembly of mixer elements is also achieved if mixer elements which are respectively one removed from each other are arranged such that the outer sides of the outermost ends of their longitudinal components contact one another. In a preferred embodiment of this assembly the turning angle α between adjacent mixer is from 125° to 130°. A further embodiment of the static mixer of the present invention is one wherein at least one mixer element is one-removed from another mixer element, and at least one edge of at least one longitudinal component of the one mixer element comes into contact with at least one edge of at least one longitudinal component of the other mixer element.

Further preferred is a variant of the static mixer wherein the housing has a support and optionally, in addition, a hold-down device by means of which the assembly of mixer elements is secured in the housing.

Particularly preferred furthermore is a static mixer in which the mixer elements are arranged in the housing such that they are stacked in such a way that they can be detached from one another.

The invention is explained in more detail below by way of example with reference to the figures, in which:

FIG. 1a shows a mixer according to the invention with H-shaped mixer elements in side view, with the housing being represented in section, FIG. 1b shows the mixer from FIG. 1a in plan view, FIG. 2 shows the assembly of mixer elements of the mixer from FIG. 1a with a viewing direction along a mixer element 2d, FIG. 3a shows a mixer according to the invention with X-shaped mixer elements in side view, with the housing being represented in section, FIG. 3b shows the mixer from FIG. 3a plan view, FIG. 4 shows an assembly of mixer elements, which have cut edges perpendicular to the plane of the mixer elements, FIG. 5 shows a mixer element 2e from FIG. 4, FIG. 6 shows a mixer element similar to FIG. 5, in which longitudinal component 8 has wide section 9, FIG. 7 shows a mixer element with a connecting longitudinal component 10 offset from the center of connected longitudinal components 20 and 20a, FIG. 8 shows a mixer element with notches, FIGS. 9a–c show a mixer element with surface-area contact in relation to other mixer elements, FIGS. 10a, b show a mixer with H-shaped mixer elements, in which the mixer elements touch other mixer elements which are one removed from it at their outer surfaces, FIG. 11a shows a mixer element with first and second longitudinal components 18a and 18c spaced apart from each other, with a third longitudinal component 18b between them, joined by a fourth longitudinal component 19, wherein the joining component 19 is off-set from the longitudinal midpoint of each of said first, second and third longitudinal components and is joined to each of said first, second and third longitudinal components at a different distance from the longitudinal midpoints of each.

EXAMPLES

Example 1

Figure 1A:
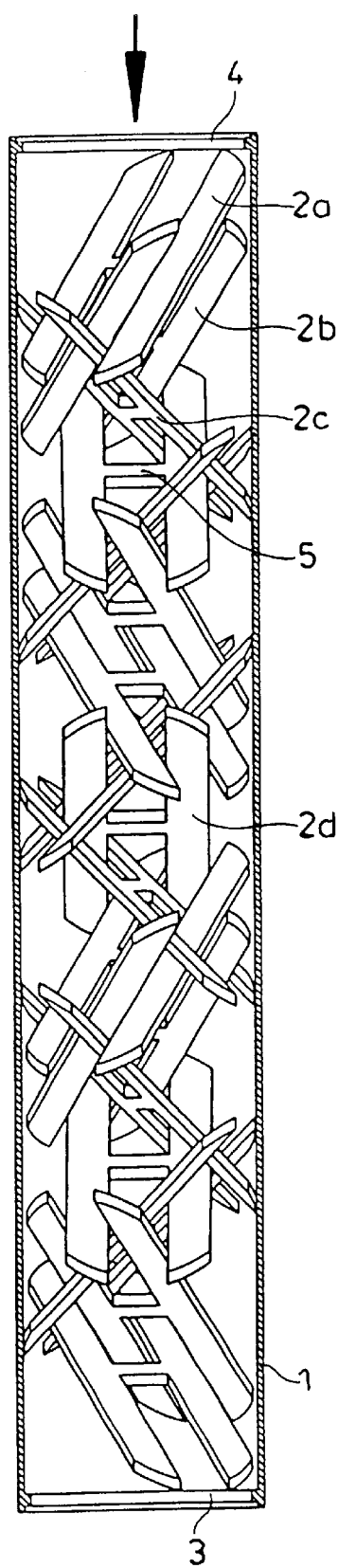

In FIG. 1a, a mixer according to the invention with H-shaped mixer elements 2a, 2b, 2c is represented in a side view; in this figure, the housing 1 is represented in longitudinal section. The lowermost mixer element rests on the support 3, which is formed here by an annular inner contour. The uppermost mixer element 2a is fixed in the upward direction by the annular hold-down device 4.

Figure 1B:
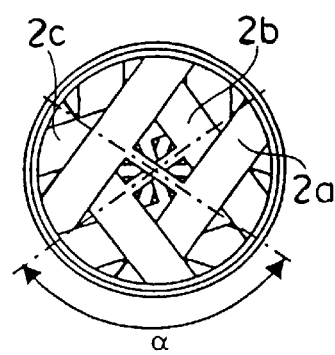

FIG. 1b shows a plan view in the direction of the product stream. The product stream is indicated in each case in the figures by the upper arrow.

Figure 2:
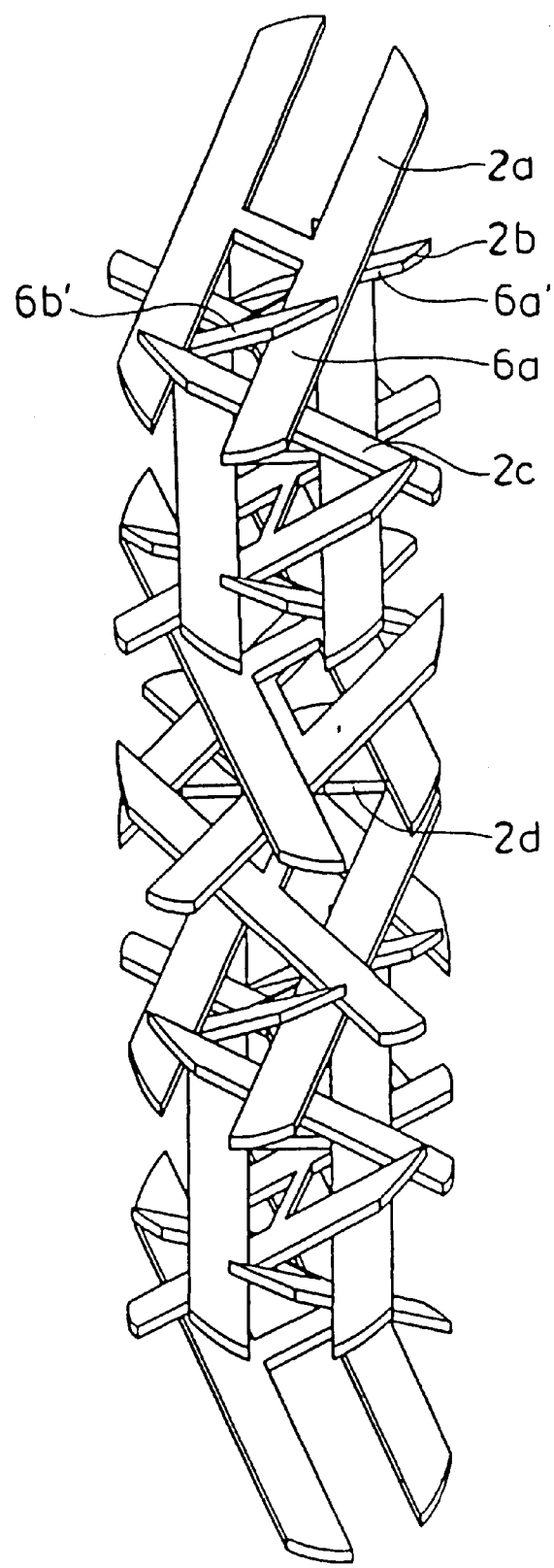

FIG. 2 shows a view along a mixer element 2d. It can be seen that the mixer element 2d is fixed in its position by the neighboring and next-neighboring mixer elements. This is achieved by the engagement of longitudinal components (teeth), as best seen with reference to 6a, 6b, 6a' etc.

In this configuration, successive mixer elements 2a are turned with respect to one another by the angle α=108° 11', as depicted in FIG. 1b.

The internal diameter of the mixer is 3.92 times the distance between the spaced apart longitudinal components ("teeth") of the mixer elements.

The edges at the ends of the longitudinal components of the mixer elements are rounded in such a way that they rest evenly on the inside wall of the housing.

Example 2

Figure 3A:
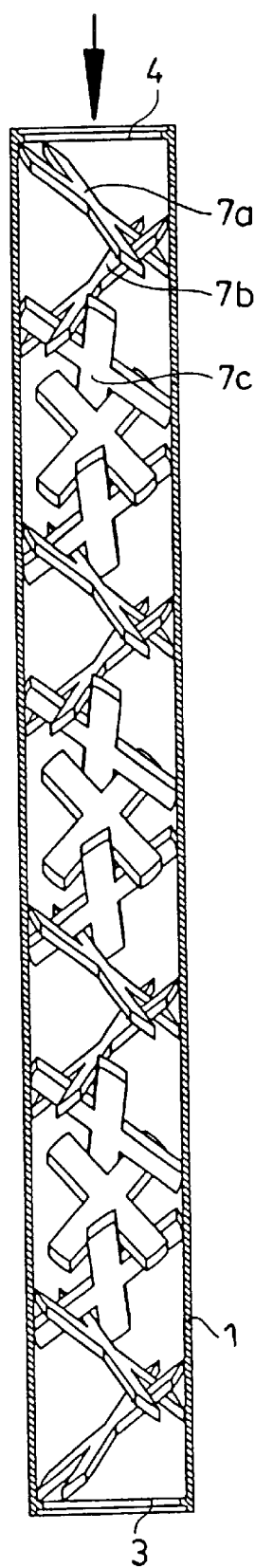

In FIG. 3a a mixer according to the invention with X-shaped mixer elements 7a, 7b, 7c is represented in a side view; in this figure, the housing is represented in section. Here, too, the combination of the support 3 and the hold-down device 4 fixes the assembly of mixer elements 7a, 7b, 7c arranged in between.

Figure 3B:
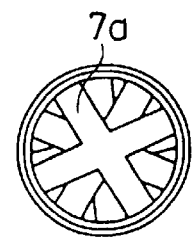

FIG. 3b shows a plan view of this mixer in the direction of the product stream. It can be seen from this that successive mixer elements are turned by 144° with respect to one another.

Example 3

Figure 4:
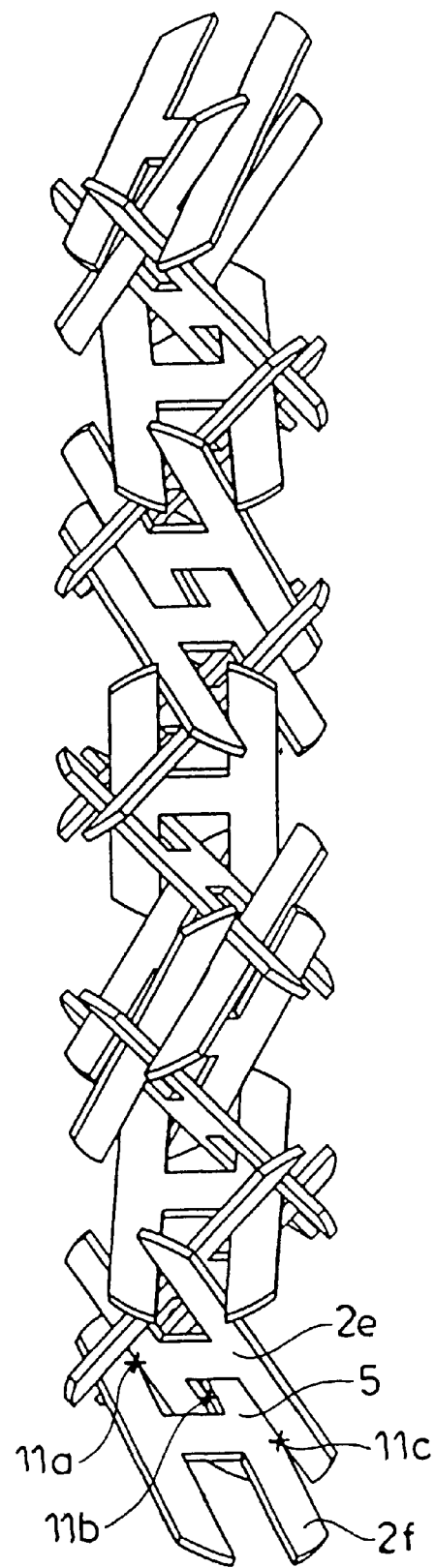

FIG. 4 shows an assembly of mixer elements as they would be assembled within a static mixer, comprising mixer elements which have been made from 2 mm thick metal sheets for a tube with an inside diameter of 50 mm.

By contrast with the assembly of mixer elements in FIG. 1 (Example 1), the cut edges were not chosen parallel to the tube axis, but perpendicular to the metal sheet, in order to simplify production. While laser cutting was used as the production method for producing the specimens, the mass production of such mixer elements can be performed by punching.

The width (5 of 10 mm) of the longitudinal component (central bar) which joins the two spaced apart longitudinal components has been increased significantly in comparison with the variant according to FIG. 1, in order to achieve a greater strength of the mixer elements during use and to avoid a preferential through-flow in the axial center of the tube by the product being mixed.

The distance between the spaced apart longitudinal components is 12.9 mm, the ratio of the tube diameter to this distance 3.9. Successive mixer elements are turned with respect to one another by an angle α of 108° 55'. Mixer elements respectively arranged once removed from each other touch one another.

The three points of contact 11a, 11b, 11c between neighboring mixer elements 2e and 2f are specially marked.

Example 4

FIGS. 5 to 9 show various configurations of H-shaped mixer elements.

Figure 5:
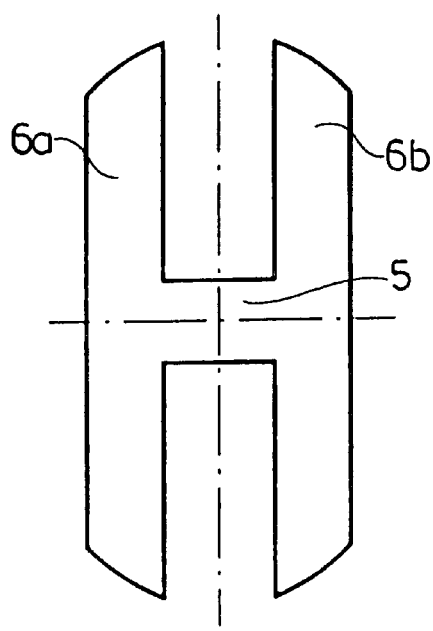

FIG. 5 shows an H-shaped mixer element 2e from FIG. 4 with the spaced apart longitudinal components 6a and 6b and also the joining longitudinal component 5 (central bar).

Figure 6:
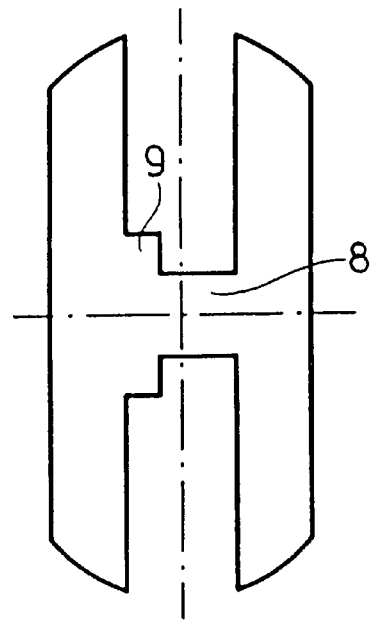

FIG. 6 shows a similar mixer element, in which however there is a wide section 9 on the joining longitudinal component 8 (central bar), so that between two neighboring mixer elements there is an additional point of contact, which facilitates the mounting of an assembly of individual mixer elements in the housing 1 of a mixer.

Figure 7:
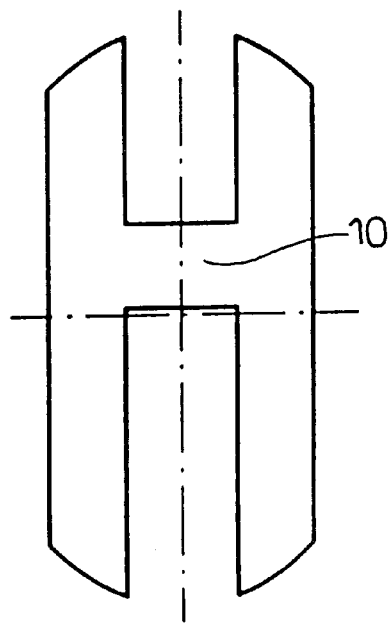

FIG. 7 shows a mixer element with the joining longitudinal component 10 offset from the longitudinal mid point of the spaced apart longitudinal components 20 and 20a. With an assembly of mixer elements in the housing 1, this produces an additional point of contact with a neighboring mixer element.

Figure 8:
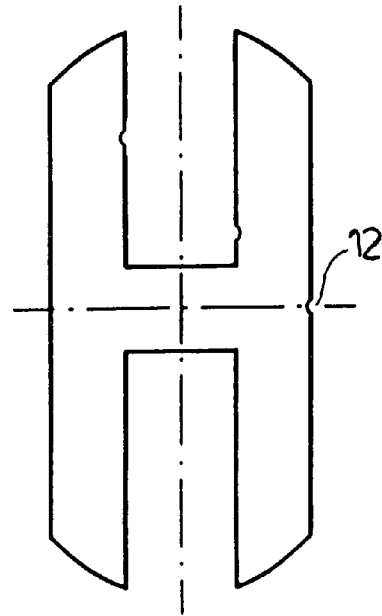

FIG. 8 shows a design of a mixer element with notches 12 at the points of contact in relation to an adjoining mixer element, which facilitate mounting and promote greater stability.

Example 5

In the case of the mixer elements shown so far, all the contacts of neighboring mixer elements are point contacts. This limits the permissible pressure drop during use of the mixer elements.

Areas of surface contact are obtained in the case of cut edge surfaces which are perpendicular to the plane of the mixer elements, as are produced for example during punching, if the planes of two neighboring elements are perpendicular to one another. This is the case if the following applies for the angle β (see FIG. 9a) between the plane of the mixer element and the longitudinal axis of the mixer and the angle α (see FIG. 9a), the turning angle of the mixer elements about the longitudinal axis of the mixer between adjacent mixer elements:

$$\alpha = 2 \cdot \arcsin\left(\frac{\sqrt{2}}{2 \cdot \cos(\beta)}\right)$$

Figure 9A:
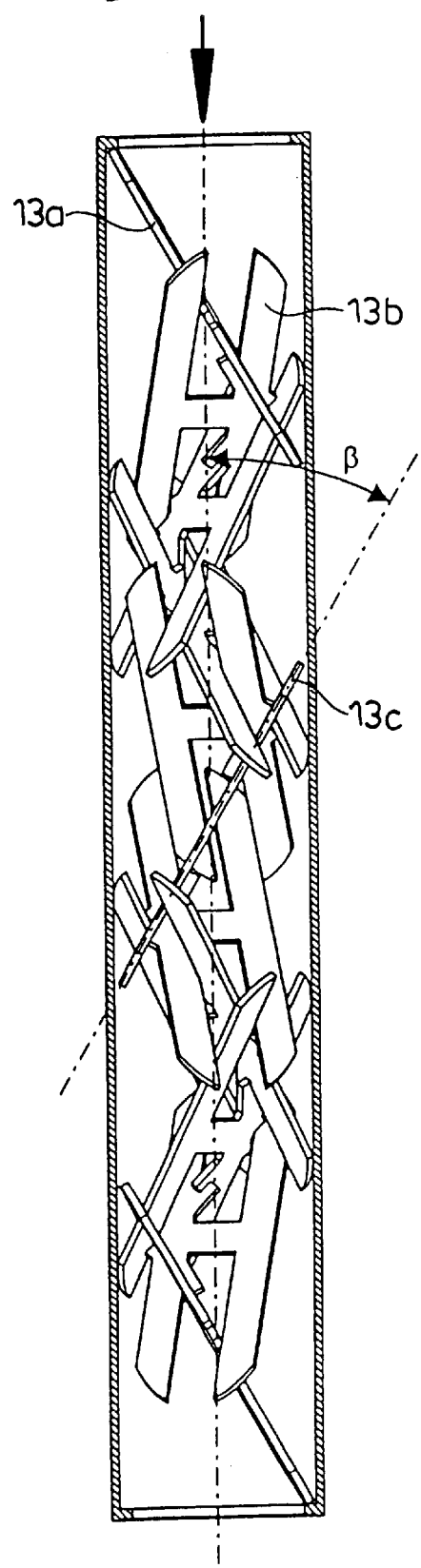
Figure 9B:
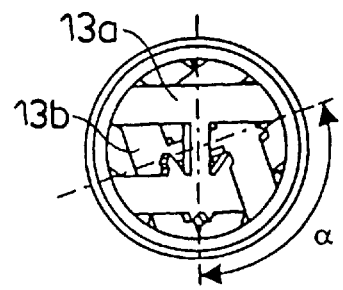
Figure 9C:
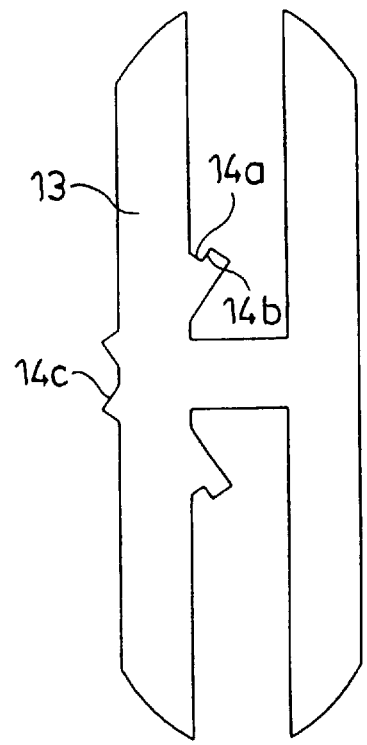

FIG. 9a shows a mixer element with specially shaped projections, with which surface-area contact of neighboring mixer elements is obtained on the surfaces 11a, 11b and 11c of the projections during the assembling of a assembly of mixer elements such as that shown in FIGS. 9a and 9a.

In the example, the angle α is 108.34° and the angle β is 29.29°.

Example 6

In the above configurations, projections, notches and steps were used on the longitudinal components ("teeth") of the mixer elements 15a, 15b, 15c in order to improve the stability of an assembly, in particular during mounting.

Figure 10A:
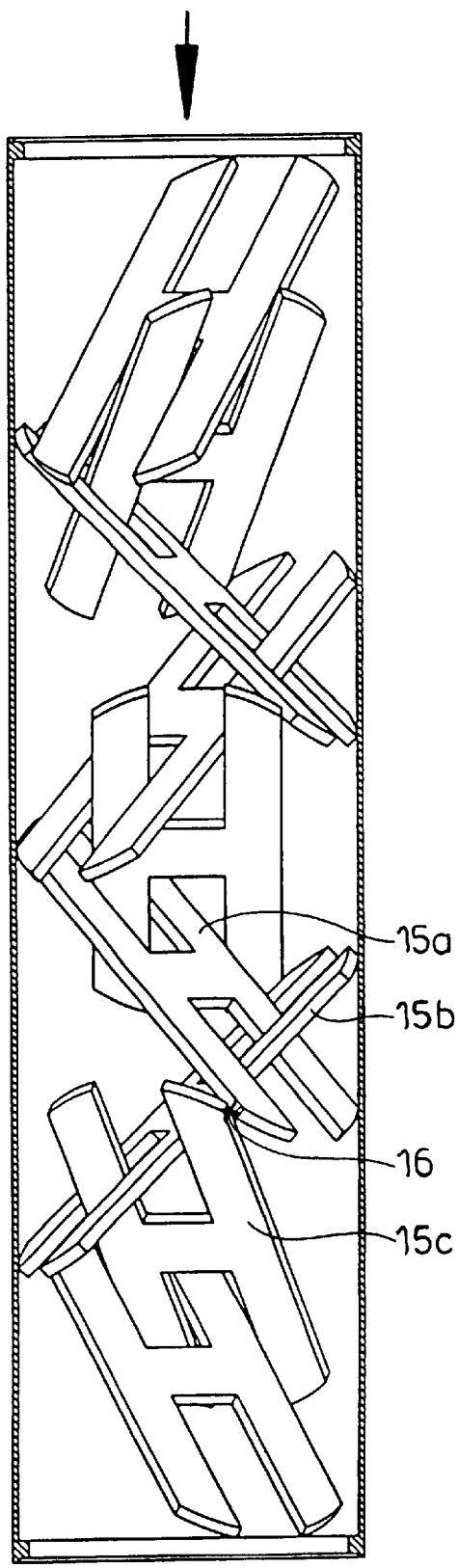
Figure 10B:
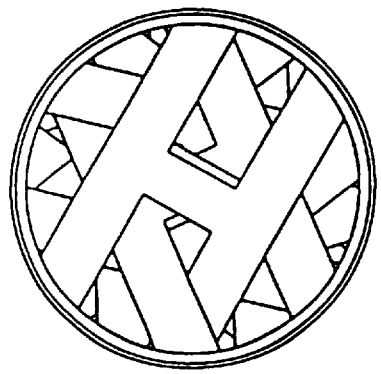

In the configuration shown in FIGS. 10a and 10b, this is alternatively achieved by the contact between two mixer elements one removed from each other taking place on the outer side of the longitudinal components (cf. point of contact 16). This corresponds to a preferred turning angle α (cf. FIG. 1b), seen about the direction of flow, of mixer element to mixer element of 125° to 130°. In FIG. 10b, the angle α is 127°.

Example 7

Figure 11A:
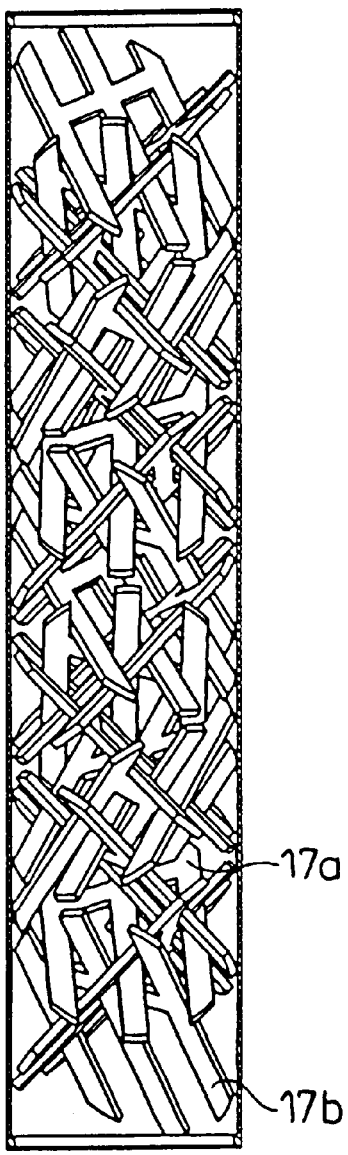
FIG. 11b shows a mixer according to the invention, with the mixer elements of FIG. 11a, wherein elements contact other elements which are one removed from them.
FIG. 11c shows the mixer of FIG. 11a in plan view.
Figure 11B:
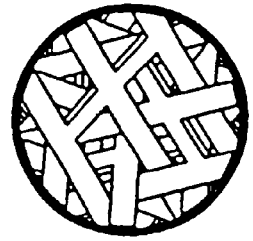

FIG. 11b shows an example of a mixer with mixer elements 17a, 17b, which have three spaced apart longitudinal components 18a–c joined by joining longitudinal component 19.

In the example, the angle α is 108.34° and the angle β is 29.29°.

The joining component 19 is arranged off-center, so that an element 17a rests with linear contact in each case on the portions 19a, 19b of the joining component 19 of the respectively one removed mixer element 17b in the assembly of mixer elements.

Figure 11C:
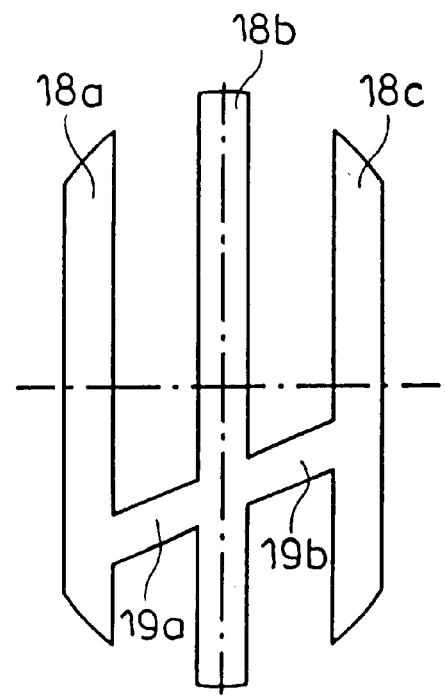

FIG. 11c shows the view of the mixer 1 from above.

I claim:

1. A static mixer comprising a hollow housing defining an internal longitudinal passageway, having a longitudinal axis, within which a plurality of planar mixer elements are arranged, one after the other such that they are stacked in the housing to form an assembly of mixer elements, said planar mixer elements are comb- or star shaped planar elements with a central bar on which at least two teeth are provided on each of both sides of the bar and wherein adjacent mixer elements within the static mixer are rotated about the longitudinal axis of the longitudinal passageway of the housing by an angle α with respect to each other so that one tooth of a mixer element in each case reaches into the intermediate space between two teeth of a respectively adjacent mixer elements.

2. Static mixer according to claim 1, wherein said mixer elements are H-shaped, and the planes of neighboring H-shaped mixer elements are turned by an angle α of 100 to 110° with respect to each other.

3. A static mixer, comprising a hollow housing defining an internal longitudinal passageway, having a longitudinal axis, within which a plurality of planar mixer elements are arranged, one after the other such that they are stacked in the housing to form an assembly of mixer elements, said planar mixer elements are comb shaped and having:
   a) first and second longitudinal components, each having two transverse edges and two longitudinal edges; said two longitudinal components being spaced apart from each other and connected to each other by a third longitudinal component having two transverse edges and two longitudinal edges, one transverse edge of said third longitudinal component being connected to one longitudinal edge of one of said first and second longitudinal components, and the other transverse edge of said third longitudinal component being connected to one longitudinal edge of the other of said first and second longitudinal components, and optionally having one or more further longitudinal components between and spaced apart from said first and second longitudinal components and from each other, and joined to each other and to said first and second longitudinal components by said third longitudinal component, or said mixer elements are star shaped and having:
   b) first and second longitudinal components which intersect each other to form a figure

wherein γ represents an angle of from 10° to 170°.

4. Static mixer according to claim 3, wherein said angle γ represents an angle of 45° or 90°.

5. Static mixer according to claim 1 or 3, wherein mixer elements within the static mixer are rotated about the longitudinal axis of the longitudinal passageway of the housing by an angle α of 35° to 160° with respect to other adjacent mixer elements.

6. Static mixer according to claim 5, wherein said angle α is from 45° to 135°.

7. Static mixer according to claim 1 or 3, wherein said mixer elements are H, or X shaped.

8. Static mixer according to claim 7, wherein said mixer elements are H- or X-shaped.

9. Static mixer according to claim 1 or 7, wherein at least one end of the transverse components of the mixer elements has a transverse edge which has a width and a length, and is rounded across the length of said transverse edge such as to result in line or surface contact to the hollow housing.

10. Static mixer according to claim 1 or 3, wherein two neighboring mixer elements contact one another at at least three different points.

11. Static mixer according to claim 1 or 3, wherein mixer elements which are one-removed from each other contact each other, in addition to contacting mixer elements between them.

12. Static mixer according to one of claim 1 or 3, wherein the mixer has H-shaped mixer elements and the diameter of the longitudinal passageway of the housing is 3.5 to 5 times the width of the space between adjacent ends of the longitudinal components of the mixer elements.

13. Static mixer according to claim 1 or 3, wherein neighboring mixer elements have interengaging notches at their points of contact with each other.

14. Static mixer according to claim 1 or 3, wherein at least one portion of at least one longitudinal component of the mixer elements has a greater width than the remainder of such longitudinal component.

15. Static mixer according to claim 14, wherein said mixer elements are H-shaped mixer elements, and said at least one longitudinal component is the longitudinal component which connects the two spaced apart longitudinal components of the H to each other.

16. Static mixer according to claim 1 or 3, wherein said mixer elements have first and second longitudinal components which are joined to each other by a third longitudinal component, and said third longitudinal component is attached to each of said spaced apart longitudinal components at a position on a longitudinal edge of each, which position is offset from the longitudinal midpoint of said longitudinal edge.

17. Static mixer according to claim 1 or 3, wherein neighboring mixer elements contact each other, with surface areas and have supporting surfaces at the areas of contact with each other.

18. Static mixer according to claim 1 or 3, wherein at least one mixer element is one removed from another mixer element, and at least one edge of at least one longitudinal component of said at least one mixer element comes into contact with at least one edge of at least one longitudinal component of said other mixer element.

19. Static mixer according to claim 18, wherein the angle α is from 125° to 130°.

20. Static mixer according to claim 1 or 3, wherein said housing has a support and optionally, in addition, a hold-down device by means of which the assembly of mixer elements is secured in the housing.

21. Static mixer according to claim 1 or 3, wherein the mixer elements in the assembly of mixer elements are detachable from one another.

22. Static mixer according to claim 1 or 3, wherein said mixer elements comprise two spaced apart longitudinal components which are connected by a third longitudinal component and further comprise at least one additional longitudinal component between and spaced apart from said two spaced apart longitudinal components, and said at least one additional longitudinal component is also connected to said two longitudinal components by said third longitudinal component.

23. Static mixer according to claim 1 or 3, wherein said mixer element is an X-shaped mixer element and comprises one or more further longitudinal components which cross at least one of the two longitudinal components defining the X shape.

\* \* \* \* \*